(12) United States Patent
Brix et al.

(10) Patent No.: US 7,767,725 B2
(45) Date of Patent: Aug. 3, 2010

(54) HIGH PROCESSING TEMPERATURE FOAMING POLYMER COMPOSITION

(75) Inventors: Susanne Brix, Eckental (DE); Friedrich Müller, Lauf (DE); Christian Lankes, Feucht (DE); Alfred Gemmel, Kalchreuth (DE); Olivier Pinto, Lyons (FR); Mikael Abeguile, Chaponost (FR); Jérôme Alric, L'Isle d'Abeau (FR); Thierry Auvray, Lancaster, PA (US); Paul Kroushl, Lancaster, PA (US)

(73) Assignee: Nexans (FR)

( * ) Notice: Subject to any disclaimer, the term of this patent is extended or adjusted under 35 U.S.C. 154(b) by 0 days.

(21) Appl. No.: 12/315,077

(22) Filed: Nov. 26, 2008

(65) Prior Publication Data
US 2009/0206502 A1 Aug. 20, 2009

(51) Int. Cl.
*C08F 14/26* (2006.01)
*B29C 44/34* (2006.01)

(52) U.S. Cl. ............ 521/85; 521/94; 521/142; 521/145

(58) Field of Classification Search ........... None
See application file for complete search history.

(56) References Cited

U.S. PATENT DOCUMENTS

| 5,912,278 | A | 6/1999 | Venkataraman |
| 6,284,810 | B1 | 9/2001 | Burnham |
| 2003/0011958 | A1 | 1/2003 | Kolmschlag |
| 2005/0137371 | A1 | 6/2005 | Smith |

FOREIGN PATENT DOCUMENTS

| EP | 0803878 | 10/1997 |
| EP | 1117103 | 7/2001 |

*Primary Examiner*—Irina S Zemel
(74) *Attorney, Agent, or Firm*—Sofer & Haroun, LLP

(57) ABSTRACT

A foaming composition comprising a melt processible fluoropolymer, and a chemical foaming agent, where the chemical foaming agent is ammonium polyphosphate.

9 Claims, 3 Drawing Sheets

HIGH PROCESSING TEMPERATURE FOAMING POLYMER COMPOSITION

RELATED APPLICATION

This application claims the benefit of priority from European Patent Application No. 07 291 426.0, filed on Nov. 29, 2007 and European Patent Application No. 08 305 287.8, filed on Jun. 19, 2008, the entirety of which are incorporated by reference.

FIELD OF THE INVENTION

The present invention relates to a foaming fluoropolymer composition, an extrusion process of said composition, an electrical cable comprising an insulated layer and/or a cross spacer obtained by said process.

More particularly this composition is for use in the manufacture of dielectric insulated material for electrical cables (power or communication cables), such as Local Area Network (LAN) cables, aeronautic cables, Bus cables and automotive cables.

BACKGROUND

Fluoropolymers have generally excellent suitability for electrical applications since they present a low dielectric constant and a low dissipation factor, but they are quite expensive. Hence it is desirable to minimize the amount of insulated material in providing a foaming fluoropolymer composition.

In addition, even at high temperatures, fluoropolymers are stable and do not burn, and they can therefore in principle be used not only for electrical purposes but in all fields of engineering.

However no chemical foaming agent providing a decomposition temperature superior to the melting point of fluoropolymer exists on the market.

Document U.S. Pat. No. 6,064,008 proposes a flame retardant communication cable comprising elongated electrical conductor surrounded by a layer of insulating material, said insulating material comprising a chemically blown fluorinated polymer having a melting point of greater than about 248° C.

The insulated material is foamed using a chemical foaming agent, which decomposes at a temperature above the temperature needed to melt the fluorinated polymer and the gas evolved from the chemical foaming agent.

A particularly suitable chemical foaming agent is the barium salt of 5-phenyltetrazole.

However such chemical foaming agent presents a decomposition temperature below the fluorinated polymer having a melting point greater than about 248° C.

According to Plastic Additive Handbook, $5^{th}$ edition, H. Zweifel, pp. 711, the barium salt of 5-phenyltetrazole begins to decompose at a temperature below 248° C., i.e. 240° C.

In the case of said prior art document, the decomposition of the barium salt of 5-phenyltetrazole occurs too early during the extrusion process and thus released gaseous products are not efficiently diluted and voids are not dispersed into the molten fluorinated polymer.

Therefore the composition with such chemical foaming agent cannot provide a chemically foamed fluorinated polymer with homogeneous aspect presenting good mechanical and electrical properties due to the difficulty of controlling the foaming process.

OBJECTS AND SUMMARY

The present invention seeks to solve the above-mentioned problems of the prior art.

To this end, an object of the present invention is to provide a foaming composition comprising a melt processible fluoropolymer, and a chemical foaming agent, characterized in that said chemical foaming agent is ammonium polyphosphate.

By means of the invention, said composition leads to stable foaming process, more particularly during extrusion, in terms of diameter control, void degree and capacitance consistency.

Furthermore, once said composition foamed, it provides high performances dielectric properties in improving the electrical transmission characteristics of the resulting cables, in particular in the domain of LAN cables.

Fluoropolymer of the present invention is thermoplastically processible. Hence, it can be melted and therefore extruded by a conventional technique.

The thermoplastic extrudable fluoropolymer of the present invention has preferably a melting temperature above 250° C. and is advantageously a tetrafluoroethylene copolymer.

For example, said tetrafluoroethylene copolymer can be selected from the group of:
tetrafluoroethylene and hexafluoropropylene copolymers (FEP);
tetrafluoroethylene perfluoroalkoxy vinyl ether copolymers such as tetrafluoroethylene perfluoromethyl vinyl ether copolymers (MFA), tetrafluoroethylene perfluoropropyl vinyl ether copolymers (PFA);
ethylene tetrafluoroethylene copolymers (ETFE);
ethylene chlorotrifluoroethylene copolymers (ECTFE); and
polytetrafluoroethylene (PTFE); or mixtures thereof.

Furthermore, such foaming composition further allows to minimize the amount of fluoropolymers required, which are expensive.

In another embodiment of the present invention, the composition comprises less than 3% by weight of the ammonium polyphosphate based on 100% by weight of polymer in the composition, more preferably less than 1% by weight of the ammonium polyphosphate based on 100% by weight of polymer in the composition.

In another embodiment of the present invention, the composition comprises more than 0.05% by weight of the ammonium polyphosphate based on 100% by weight of polymer in the composition, more preferably more than 0.5% by weight of ammonium polyphosphate based on 100% by weight of polymer in the composition.

In a variant, said composition further comprises a nucleating agent, more particularly said nucleating agent is boron nitride.

In addition, it is preferable that the amount of the nucleating agent is from 0.5% to 2% by weight based on 100% by weigh of polymer in the composition in order that the extruded composition keeps good mechanical properties.

Another object is an extrusion process of a foaming composition comprising the following steps:
blending a foaming composition according to the present invention above the temperature needed to melt the fluoropolymer and below the temperature needed to decompose the chemical foaming agent, and
extruding said composition above the temperature needed to decompose the chemical foaming agent.

The chemical foaming agent of the present invention, i.e. ammonium polyphosphate, decomposes typically from 340° C. in the fluoropolymer composition.

In the case of extrudable PTFE, it starts to melt at a temperature of about 320° C. and at temperatures higher than that it can be processed thermoplastically. The foamed PTFE leads to a reduction in the viscosity of the PTFE.

The invention therefore permits production of extrudate composed of foamed fluoropolymer by means of commercially available extruders. After discharge of the extrudate from the extruder, no further measures relating to the foaming procedure are required, since the reactants for the foaming process are already present in the extruder or are introduced into the same, and the extruder possesses the heat required to decompose the chemical foaming agent, thus yielding a foamed extrudate.

An extrudate thus obtained can then be directly introduced to further operations, among which is by way of example winding onto a reel.

Examples of extrudates that can be produced by the process according to the invention are rods, pipes, tapes, and insulation and sheathing for lines.

Another object is an electrical cable comprising a dielectric insulating layer obtained by the extrusion process according to the present invention. Said electrical cable can advantageously be a coaxial high-frequency cable or LAN cable.

Another object is an electrical cable comprising a cross spacer obtained by the extrusion process according to the present invention. Cross spacer is used in LAN cable construction in order to reduce crosstalks between twisted pairs.

BRIEF DESCRIPTION OF THE DRAWINGS

Other characteristics and advantages of the invention are described below in detail in the following description, which is given by way of non-limiting illustration, taken in conjunction with the drawings, in which.

DETAILED DESCRIPTION

The polymer melting temperatures as well as the chemical foaming agent decomposition temperature, mentioned all over the present description, can be determined by method well known in the art.

The polymer melting temperatures is by example determined by the melt enthalpy provided by Differential Scanning Calorimetry (DSC) with a ramp T° C. of 10° C./mn.

The chemical foaming agent decomposition temperature is by example determined by Differential Scanning Calorimetry (DSC) with a ramp T° C. of 10° C./mn, 340° C. being the onset of the decomposition enthalpy peak of ammonium polyphosphate. Dynamic rheology analysis can be used as well (T° C. sweep at constant frequency: plot of viscosity vs. T° C., and comparison with solid composition), 340° C. being the onset of viscosity drop of ammonium polyphosphate versus solid viscosity behaviour. Both methods lead to comparable results.

In order to control the structure of the foam such as void degree and void size, the thermal decomposition of the chemical foaming agent must take place in a processing window temperature from 340° C. to 380° C. In said decomposition temperature ranges, ammonium polyphosphate releases gaseous products such as by example ammonia.

The chemical foaming agent decomposition of the present invention occurs in the polymer melt inside the compression zone of the extruder and bubble growth and void dispersion are controlled in the processing window temperature of said compression zone.

The following non-limiting example shows the potential of ammonium polyphosphate as chemical blowing agents in fluoropolymer composition.

For that, an extruded composition according to the invention is prepared in using an extrudable PTFE commercialized by ELRING KLINGER under the reference Moldflon, ammonium polyphosphate (APP) commercialized by Buddenheim under the reference FR CROSS S10, and boron nitride commercialized by Momentive Performance under the reference BN AC6004.

In a first step of compounding, a first compound (Compound 1) is prepared on a Berrstoff ZE-25 twin-screw extruder. The Compound 1 is detailed in Table 1 as below.

TABLE 1

| Compound 1 | Amount (% by weight) |
|---|---|
| Extrudable PTFE | 80 |
| APP masterbatch (10% by weight of APP in extrudable PTFE) | 20 |

Figure 1:
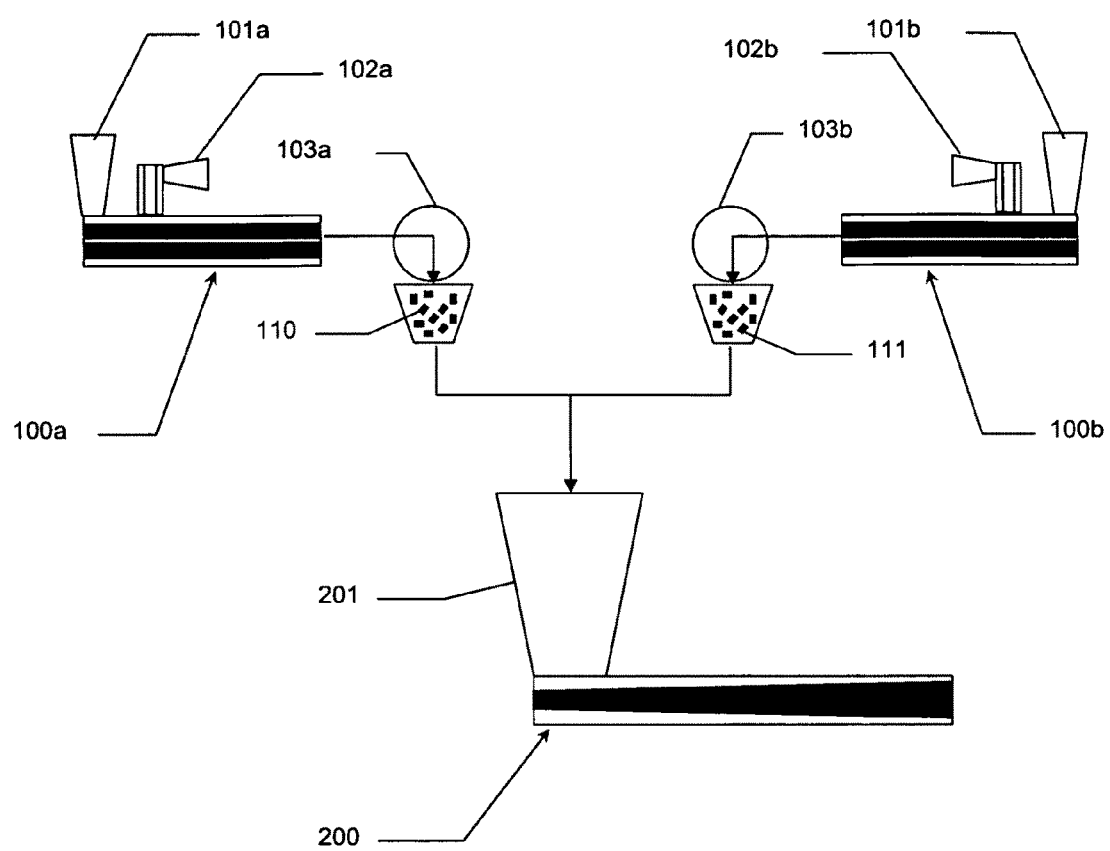
FIG. 1 is a schematic view of an extrusion process according to the present invention.

According to FIG. 1, extrudable PTFE is introduced in a first feed hopper 101a and the APP masterbatch is introduced in a second feed hopper 102a of the twin-screw extruder 100a to obtain first compound pellets 110 by a pelletizer 103a.

The temperature range of the twin-screw extruder is above the temperature needed to melt the extrudable PTFE and is below the temperature needed to decompose the ammonium polyphosphate, i.e. below 340° C. The pellets 110 obtained from the first compound are thus unfoamed.

In a second step of compounding, a second compound (Compound 2) is prepared in the same conditions used during the first step of compounding. The Compound 2 is detailed in Table 2 as below.

TABLE 2

| Compound 2 | Amount (% by weight) |
|---|---|
| Extrudable PTFE | 98 |
| Boron nitride | 2 |

According to FIG. 1, extrudable PTFE is introduced in a first feed hopper 101b and the boron nitride is introduced in a second feed hopper 102b of the twin-screw extruder 100b to obtain second compound pellets 111 by a pelletizer 103b.

Finally, a composition (Composition 1) comprising the first and second compound pellets 110, 111 is then introduced in the feed hopper 201 of a single-screw extruder 200 (FIG. 1) with a screw of 30 mm in diameter and an L/D ratio of 30. The Composition 1 is detailed in Table 3 as below and comprises finally 0.15% by weight of ammonium polyphosphate and 1.85% by weight of boron nitride.

TABLE 3

| Composition 1 | Amount (% by weight) |
| --- | --- |
| Compound 1 | 7.5 |
| Compound 2 | 92.5 |

In another embodiment, the fluoropolymer, the chemical foaming agent and the nucleating agent used in the composition according to the invention can directly be weighted and introduced at the same time in the feed hopper of a single-screw extruder, the preparation method of the composition according to the invention being not limited.

The temperature extrusion profile of the Composition 1 is shown in Table 4 as below.

TABLE 4

| Zone | Temperature (° C.) |
| --- | --- |
| Zone 1 | 330 |
| Zone 2 | 350 |
| Zone 3 | 370 |
| Zone 4 | 380 |
| Zone 5 | 380 |
| Clamp | 370 |
| Head | 370 |
| Die | 330 |

The temperature of the single-screw extruder is above the temperature needed to melt the fluoropolymer (Zone 1) and to blend the Composition 1 without decomposing the chemical foaming agent.

Then, said temperature increases (Zone 2 to Zone 5) to decompose the ammonium polyphosphate in the extruder once the extrudable PTFE is completely melted. Hence, ammonia is efficiently diluted in said melted extrudable PTFE.

Figure 2:
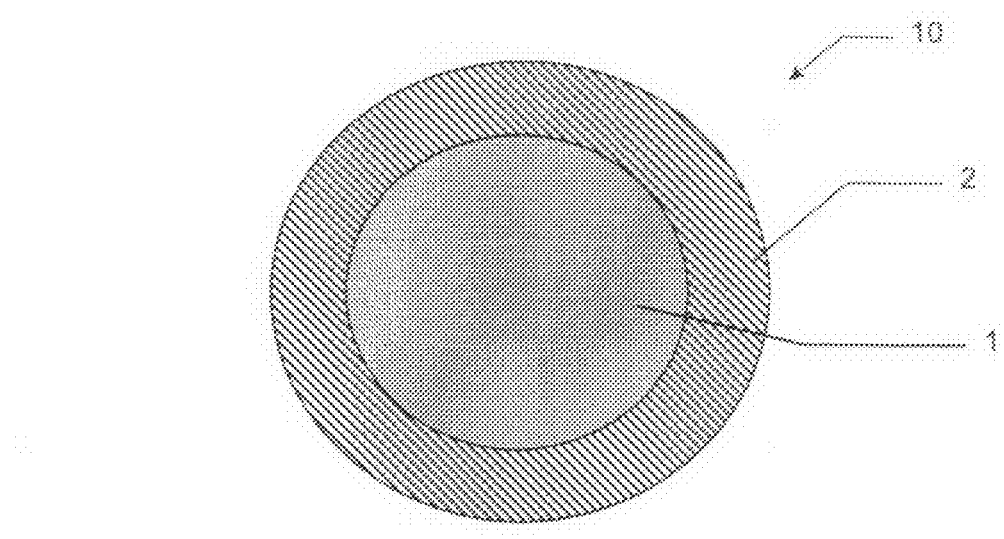
FIG. 2 is a cross sectional view of an isolated electrical wire according to the present invention.

Finally, the Composition 1 is extruded with a thickness of 0.95 mm around a copper wire with a diameter of 0.64 mm to obtain an insulated electrical wire 10 as represented in FIG. 2.

Said insulated electric 10 in a general manner an electric wire 1 surrounded by a dielectric foamed insulating layer 2 according to the present invention.

The line speed and the single-screw speed of the extruded processing conditions are respectively of 15 m/mn and 85 rpm.

Said extrusion step easily allows to control the foaming process in order to optimise the quality of the foamed composition. The dielectric foamed insulating layer presents a homogeneous structure such as its concentricity is of 91%.

Hence, ammonium polyphosphate avoids any anticipated decomposition in said extrusion step, said anticipated decomposition resulting of an inhomogeneous mixture, and thus an inhomogeneous foamed structure.

In addition, the capacitance of the dielectric foamed insulating layer obtained from Composition 1 is measured on line during extrusion using a high speed capacitance measuring instrument. The capacitance measurement device is a tube where an electronic unit supplies the measuring tube with a high frequency sinusoidal voltage. The isolated electric wire, which passes trough the measuring tube, is earthed and generates a capacitive current measured by the electronic unit.

The online capacitance specification of said dielectric foamed insulating layer is about 67±1.5 picofarads/meter. Thus it complies with dielectric requirement for LAN insulated conductor wire.

Figure 3:
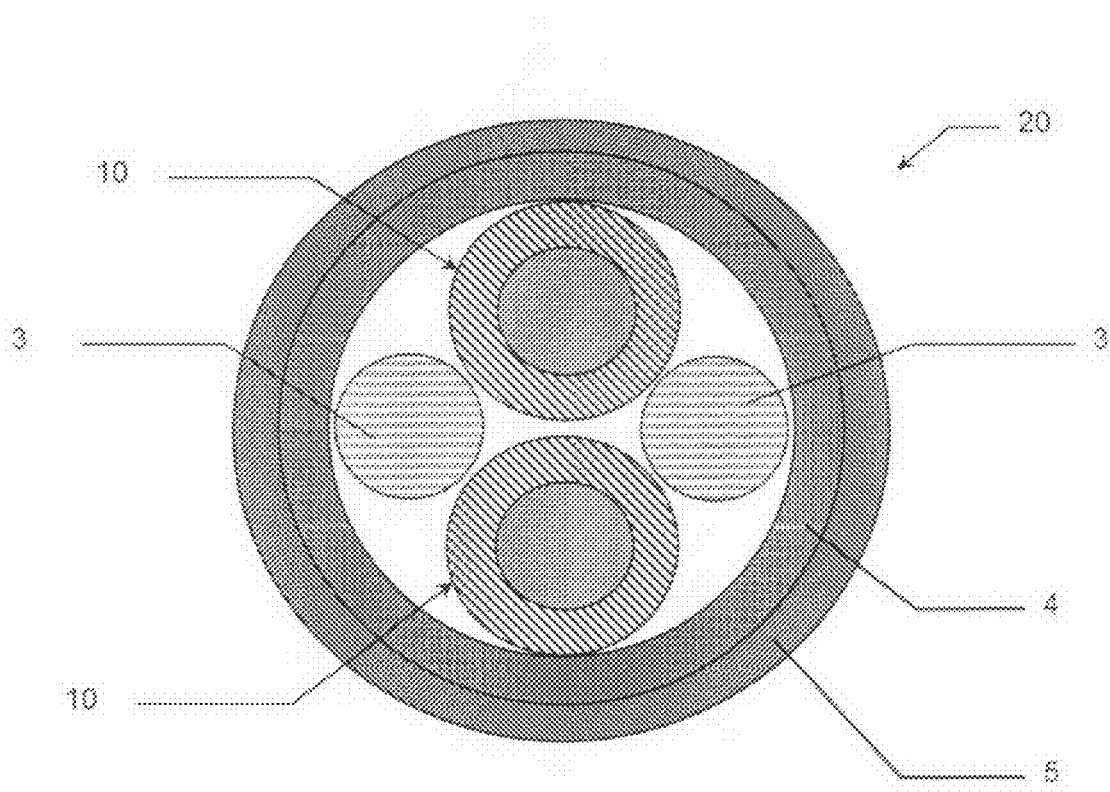
FIG. 3 is a cross sectional view of a Profibus cable according to the present invention.

The cable of FIG. 3 represents an electrical communication cable 20, such as a Profibus cable, comprising two isolated electrical wire 10 according to the present invention, twisted to a pair with fillers 3 in gaps.

In addition, said cable 20 comprises an aluminium laminate foil 4 overlapping the twisted pair of isolated electrical wire and fillers, and optionally a jacket 5, well known in the art, surrounding the foil 4.

From this example of cable embodiment, the attenuation and the impedance is determined according to EN 50289-1 (part 11 and part 8) standards.

Impedance results are mentioned is the Table 5 as below.

TABLE 5

| Frequency | Impedance (Ohm) |
| --- | --- |
| 3-20 MHz | 150 ± 15 |
| 31.25-38.4 MHz | 185 ± 18.5 |
| 9.6 kHz | 270 ± 27 |

Attenuation results are mentioned is the Table 6 as below.

TABLE 6

| Frequency | Attenuation (dB/km) |
| --- | --- |
| 16 MHz | ≦42 |
| 4 MHz | ≦22 |
| 38.4 kHz | ≦4 |
| 9.6 kHz | ≦2.5 |

Extrusion temperatures, line speed and screw speed mentioned in the present invention vary depending on extruder type, particular material, desired properties and applications. Temperatures generally range from about 250 to 500° C., and preferably range from about 300 to 450° C., according to the desired application. Line speed generally ranges from about 30 m/mm to 500 m/mm according to the desired application. Screw speed generally ranges from about 10 to 100 rpm, according to the desired application.

Figure 4:
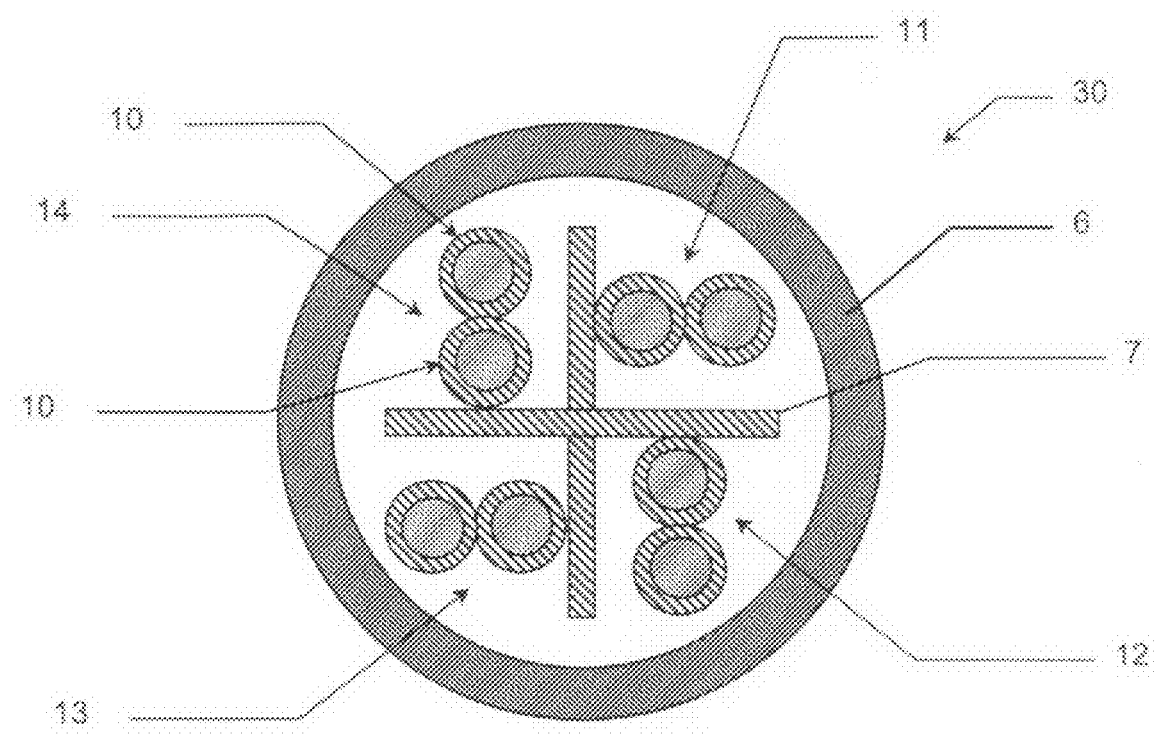
FIG. 4 is a cross sectional view of a LAN cable according to the present invention.

The cable of FIG. 4 represents an electrical communication cable 30 such as a category 6 LAN cable. It comprises four twisted pairs 11, 12, 13, 14 of isolated electrical wires 10 according to the present invention.

A sheath 6, made by example of halogen free fire resistant polyethylene (HFFR PE), polyvinyl chloride (PVC) or any type of limited combustible material, surrounds the whole of said four twisted pairs.

In addition, a cross spacer 7 separates the four pairs 11, 12, 13, 14 of conductors from each other.

It is well known that cross spacer improves the crosstalk performance and the impedance of electrical communication cable.

Advantageously, said cross spacer 7 can be made by extrusion from the foaming composition according to the present invention, providing optimised performance of said electrical communication cable.

While some embodiments of the present invention have been described above, it should be understood that it has been presented by way of examples only and not meant to limit the invention.

In this way, the electrical cables according to the invention can comprise at least one extruded element obtained from the foaming composition according to the invention such as by example a dielectric insulating layer or a cross spacer.

The invention claimed is:

1. Foaming composition comprising: a melt processible fluoropolymer, and a chemical foaming agent, wherein said chemical foaming agent is ammonium polyphosphate.

2. Composition according to claim 1, wherein said melt processible fluoropolymer is a tetrafluoroethylene copolymer.

3. Composition according to claim 1, wherein said tetrafluoroethylene copolymer is selected from the group consisting of tetrafluoroethylene and hexafluoropropylene copolymers; tetrafluoroethylene perfluoroalkoxy vinyl ether copolymers; ethylene tetrafluoroethylene copolymers; ethylene chlorotrifluoroethylene copolymers; and polytetrafluoroethylene; or mixtures thereof.

4. Foaming composition according to claim 1, wherein the composition comprises less than 3% by weight of the ammonium polyphosphate based on 100% by weight of polymer in the composition.

5. Foaming composition according to claim 1, wherein the composition comprises more than 0.05% by weight of the ammonium polyphosphate based on 100% by weight of polymer in the composition.

6. Foaming composition according to claim 1, wherein said composition further comprises a nucleating agent.

7. Foaming composition according to claim 6, wherein the composition comprises from 0.5% to 2% by weight of the nucleating agent based on 100% by weigh of polymer in the composition.

8. Foaming composition according to claim 4, wherein the composition comprises less than 1% by weight of the ammonium polyphosphate based on 100% by weight of polymer in the composition.

9. Foaming composition according to claim 5, wherein the composition comprises more than 0.5% by weight of the ammonium polyphosphate based on 100% by weight of polymer in the composition.

* * * * *